United States Patent
Brust et al.

(10) Patent No.: US 8,051,738 B2
(45) Date of Patent: *Nov. 8, 2011

(54) ROTOR GEAR FOR A GENERATOR

(75) Inventors: Eric A. Brust, Machesney Park, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/436,190

(22) Filed: May 6, 2009

(65) Prior Publication Data
US 2010/0283343 A1 Nov. 11, 2010

(51) Int. Cl.
*F16H 55/02* (2006.01)
*H02K 7/00* (2006.01)

(52) U.S. Cl. .............. 74/462; 74/458; 310/83

(58) Field of Classification Search .......... 310/75 R, 310/83, 96, 99; 74/84 R, 435, 437, 457, 74/460, 461, 462; 417/423.1; 418/61.2; 411/431; 29/893.3
See application file for complete search history.

(56) References Cited

U.S. PATENT DOCUMENTS

| | | | |
|---|---|---|---|
| 3,796,524 A * | 3/1974 | Ishikawa | 418/61.2 |
| 4,029,980 A * | 6/1977 | Gamble | 310/112 |
| 4,185,215 A * | 1/1980 | Montagu | 310/83 |
| 4,276,785 A * | 7/1981 | Rouverol | 74/462 |
| 4,526,518 A * | 7/1985 | Wiernicki | 417/420 |
| 4,974,467 A | 12/1990 | Cundy | |
| 5,090,261 A * | 2/1992 | Nakatsukasa | 74/89.14 |
| 5,152,141 A | 10/1992 | Rumford et al. | |
| 5,184,465 A | 2/1993 | Howard et al. | |
| 6,082,206 A * | 7/2000 | Terada | 74/84 R |
| 6,155,136 A | 12/2000 | Telly et al. | |
| 6,396,165 B1 | 5/2002 | Nagano et al. | |
| 6,656,079 B2 | 12/2003 | Eulenstein et al. | |
| 6,836,086 B1 | 12/2004 | Goldberg et al. | |
| 6,838,778 B1 | 1/2005 | Kandil et al. | |
| 6,838,779 B1 | 1/2005 | Kandil et al. | |
| 6,840,353 B2 * | 1/2005 | Arisaka | 188/83 |
| 7,208,854 B1 | 4/2007 | Saban et al. | |
| 7,389,712 B2 | 6/2008 | Himmelmann | |
| 2010/0327684 A1 * | 12/2010 | Grosskopf et al. | 310/83 |

* cited by examiner

*Primary Examiner* — Tran Nguyen
(74) *Attorney, Agent, or Firm* — Carlson, Gaskey & Olds, P.C.

(57) ABSTRACT

A rotor gear includes a rotor gear body having involute teeth that each have an involute surface that extends between a tooth tip and a tooth base. The involute surface includes at least reference points A-D, with reference point A near the base, reference point D near the tip, reference point B between reference points A and D, and reference point C between reference points B and D. The reference points A-D have associated respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis.

15 Claims, 3 Drawing Sheets

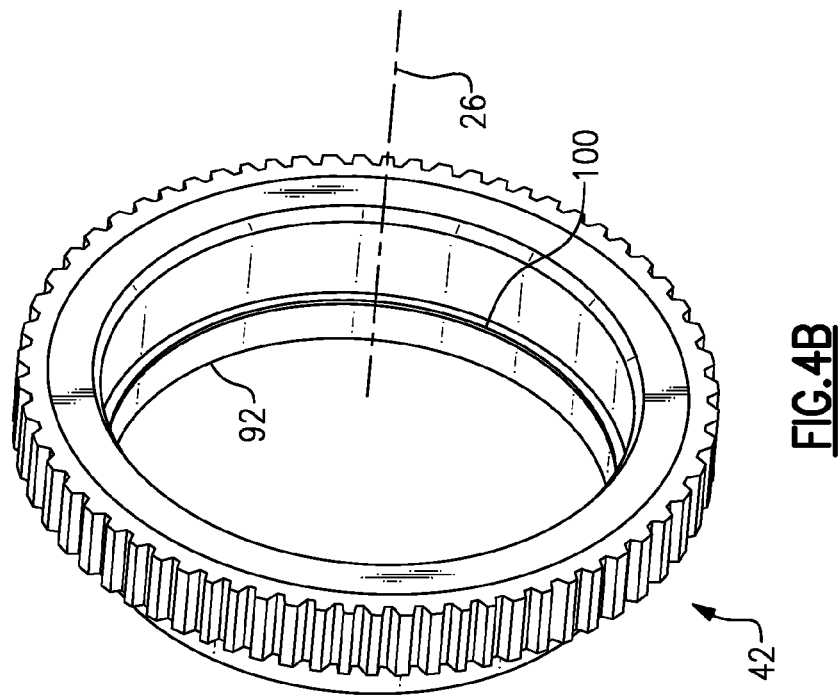
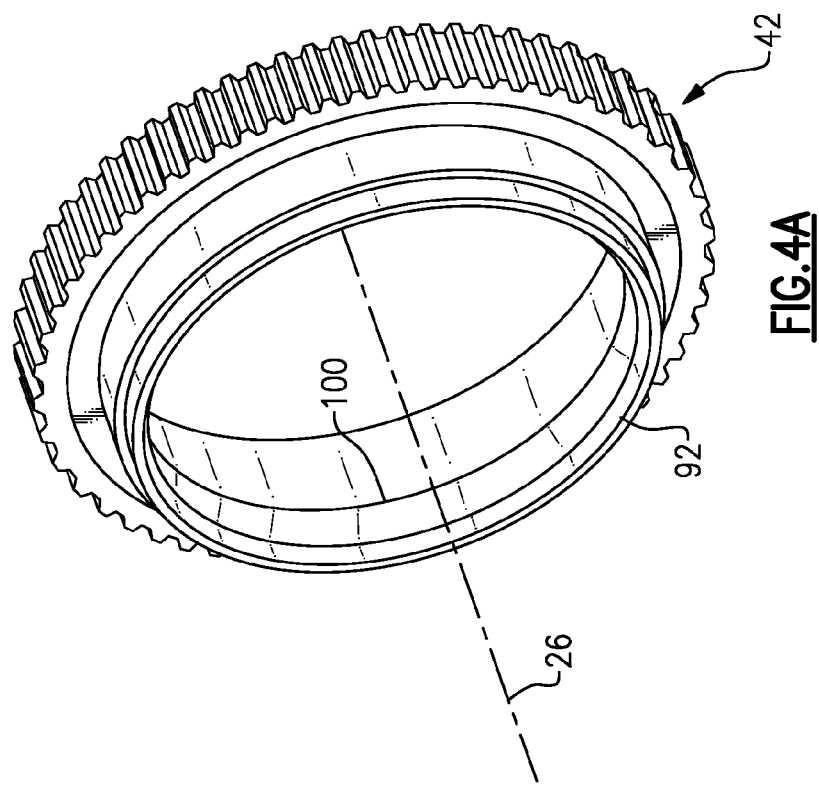

ROTOR GEAR FOR A GENERATOR

BACKGROUND OF THE INVENTION

This disclosure relates to a modified rotor gear for handling the expected stresses within a generator assembly.

Electrical generators typically include a shaft that is driven for rotation and which carries a plurality of field coils or permanent magnets. The generator may be used to also drive a hydraulic pump, such as for cooling the generator or other components of a system. A gear train may be used between the generator and the hydraulic pump. Misalignment of the gears within the gear train relative to the shafts, bearings, or other components, may increase wear on the gears and contribute to a reduction in gear durability. For instance, axial misalignment of the gears may cause uneven wear on the gear teeth and eventually necessitate replacement.

SUMMARY OF THE INVENTION

An exemplary rotor gear for a generator includes a rotor gear body having a plurality of involute teeth circumferentially located about a center axis of rotation. Each of the involute teeth includes an involute surface that extends between a tooth tip and a tooth base. The involute surface includes at least reference points A-D, with reference point A near the base circle, reference point D near the tip, reference point B between reference points A and D, and reference point C between reference points B and D. The reference points A-D have associated respective roll angles, $\epsilon_{A\text{-}D}$, between a corresponding first line that is perpendicular to the involute surface at the given reference point A-D and a second line that is tangent at a reference point that lies on a terminal end of the involute surface at the tooth base to a reference base circle having a center origin at the center axis. The roll angle $\epsilon_A$ is 11.9°-13.9°, the roll angle $\epsilon_B$ is 14.59°-16.59°, the roll angle $\epsilon_C$ is 22.66°-24.66°, and the roll angle $\epsilon_D$ is 25.35°-27.35°.

In embodiments, the rotor gear may be part of a rotor assembly for a generator, where the rotor gear is mounted on a rotor shaft that is rotatable about a central axis.

In embodiments, the rotor gear may be part of a generator and may be mounted on a rotor shaft adjacent to a rotor that rotates within a stator.

An exemplary method for processing a rotor gear for a generator may include forming the rotor gear body and establishing the roll angle $\epsilon_A$ to be 11.9°-13.9°, the roll angle $\epsilon_B$ to be 14.59°-16.59°, the roll angle $\epsilon_C$ to be 22.66°-24.66°, and the roll angle $\epsilon_D$ to be 25.35°-27.35°.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 4A illustrates a perspective view of the rotor gear.

FIG. 4B illustrates another perspective view of the rotor gear.

DETAILED DESCRIPTION OF THE PREFERRED EMBODIMENT

Figure 1:
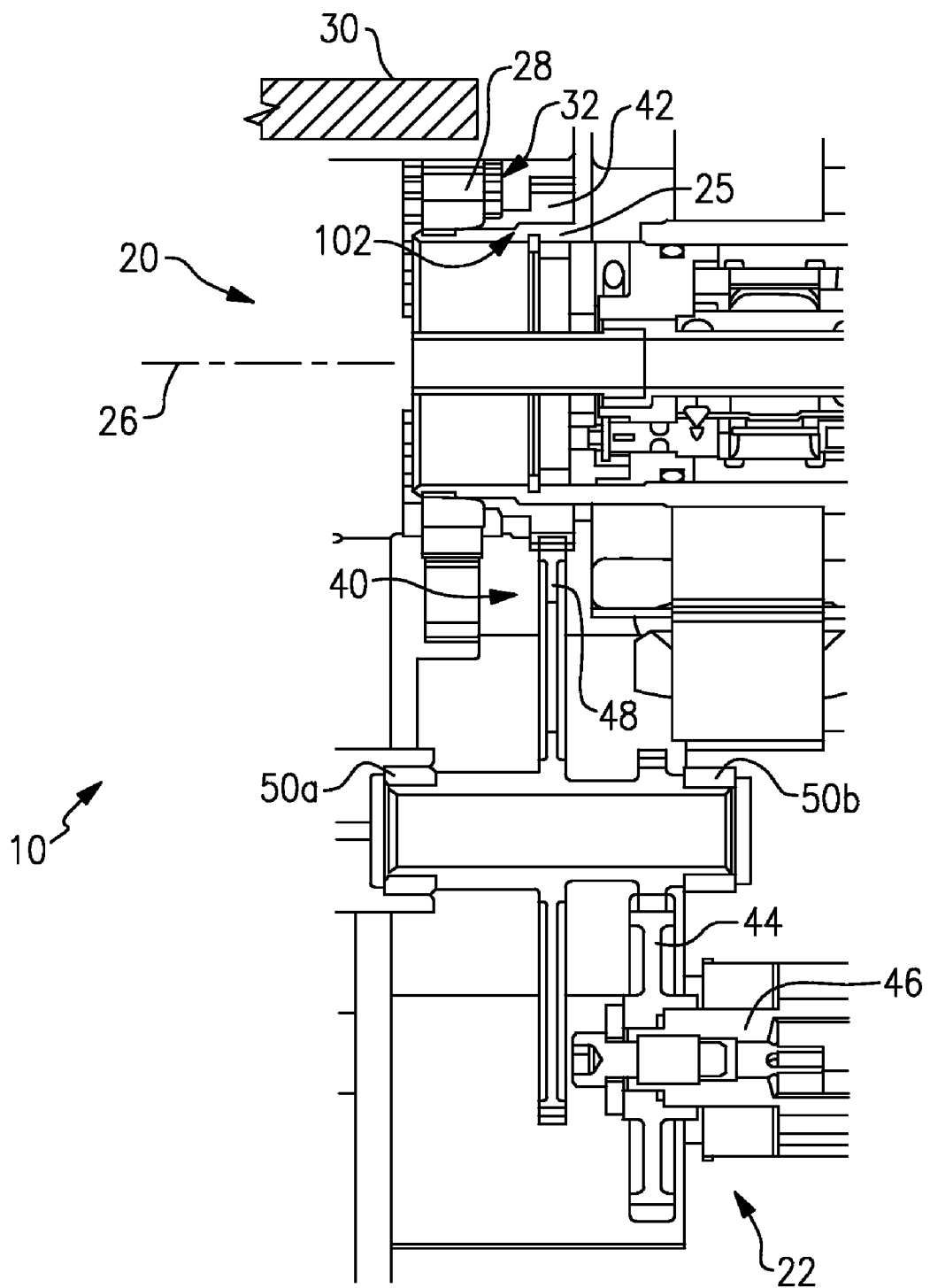
FIG. 1 illustrates an example generator having a pump and a gear train.

FIG. 1 illustrates selected portions of an example generator 10. For instance, the generator 10 may be a high speed, variable frequency generator for starting a turbine engine and generating electric current when being driven by the turbine engine.

In the illustrated example, the generator 10 includes a dynamoelectric portion 20, a hydraulic pump 22, and an idler gear 48 between the hydraulic pump 22 and the dynamoelectric portion 20. The dynamoelectric portion 20 includes a rotor shaft 25 that is rotatable about a central axis 26. A rotor 28 is mounted on the rotor shaft 25 to be driven about the central axis 26 within a stator 30 (shown in part). The rotor 28 includes a plurality of magnetic members 32, such as field coils or permanent magnets, circumferentially spaced about the rotor 28 relative to the central axis 26. The general arrangement of dynamoelectric machines is known and may vary from that shown in the illustrated examples.

The generator 10 includes a gear train 40 for driving the hydraulic pump 22 via the dynamoelectric portion 20. In this case, the gear train 40 is a gear reduction train to drive the hydraulic pump 22 at a relatively slower speed than the dynamoelectric portion 20. However, the gear train 40 may be modified in other examples.

The gear train 40 includes a rotor gear 42 mounted on the rotor shaft 25, a pump gear 44 mounted on a pump shaft 46 of the hydraulic pump 22, and an idler gear 48 mounted for rotation on journal bearings 50a and 50b. In this case, the dimensions of the journal bearings 50a and 50b may vary from part to part through normal manufacturing processes, design tolerances, or both such that there is possible axial and radial position variation of the idler gear 48 depending on the particular dimensions of the journal bearings 50a and 50b. However, as will be described, the exemplary rotor gear 42 and rotor shaft 25 are configured to facilitate reducing any effects from the dimensional variations of the journal bearings 50a and 50b.

Figure 2:
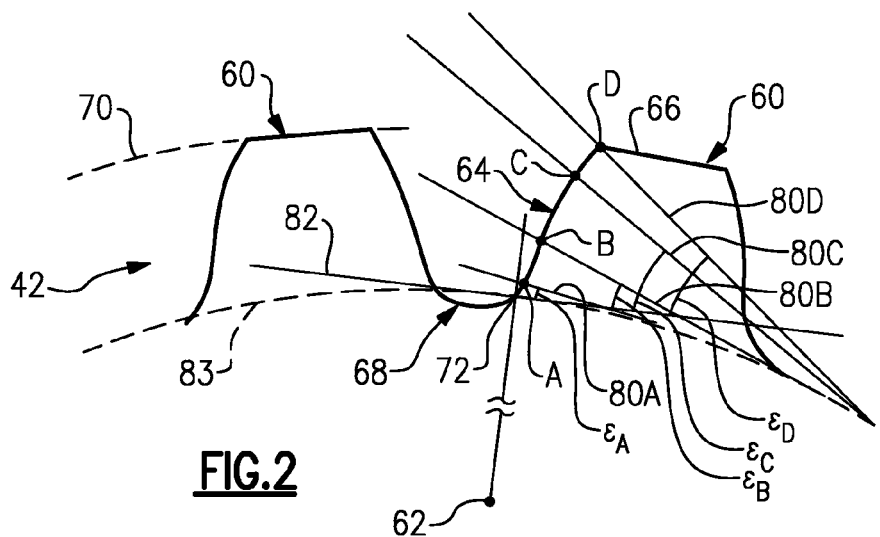
FIG. 2 illustrates gear teeth of a rotor gear of the generator in FIG. 1.

For instance, to increase the life of the rotor gear 42 by increasing durability, the rotor gear 42 includes teeth 60 (FIG. 2) that are designed with a shape that accommodates the specific loads expected from the high rotational speeds of the gear train 40. FIG. 2 illustrates several of the teeth 60 of the rotor gear 42, which are circumferentially located about a center axis 62 of rotation (e.g., which is aligned with the central axis 26) of the rotor gear 42. In this case, the teeth 60 are involute teeth that each include at least one involute surface 64 that extends between a tooth tip 66 and a tooth base 68. As an example, the tooth tips 66 may be the surfaces or points of the teeth 60 that form the outermost diameter 70 of the rotor gear 42.

Each involute surface 64 may terminate on a radially outer end at the tip 66 and at a radially inner end at a point 72 near the base 68. For instance, the point 72 may represent the point at which the involute surface 64 inflects to form a valley between neighboring teeth 60.

In profile, the involute surface 64 includes at least reference points A-D thereon, with reference point A near the base 68, reference point D near the tip 66, reference point B between reference points A and D, and reference point C being between reference points B and D. In embodiments, reference point A may essentially be at the point 72 of the terminal end of the involute surface 64 and reference point D may essentially be at the radially outer terminal end of the involute surface 64. In some examples, the locations of reference points B and C may be a function of a distance between reference points A and D. In one example, reference point B is located 20% of the distance (from reference point A), and reference point C is located 80% of the distance (from reference point A).

Each of the reference points A-D includes an associated roll angle, $\epsilon_{A-D}$, between a corresponding first line 80A-D and a second line 82 that is tangent at the point 72 to a reference base circle 83 having a center origin at the center axis 62. For instance, the roll angles $\epsilon_{A-D}$ are subtended by a portion of the involute surface 64. The locations of the reference points and the roll angles may be determined using a known involute-checking machine.

The following examples suppose that reference point A is at the point 72 of the terminal end of the involute surface 64, reference point D is at the radially outer terminal end of the involute surface 64, reference point B is located 20% of the distance (from reference point A), and reference point C is located 80% of the distance (from reference point A). In one example, the roll angle $\epsilon_A$ is 11.9°-13.9°, the roll angle $\epsilon_B$ is 14.59°-16.59°, the roll angle $\epsilon_C$ is 22.66°-24.66°, and the roll angle $\epsilon_D$ is 25.35°-27.35°.

Utilizing roll angles $\epsilon_{A-D}$ within the given ranges provides a profile of the involute surface 64 that accommodates the expected specific loads on the rotor gear 42 for the expected rotational speeds of the generator 10. That is, the radian measures of the given roll angles $\epsilon_{A-D}$ are the tangents of the pressure angles at the points on the involute surface 64 and are designed through the given roll angles $\epsilon_{A-D}$ to accommodate a particular stress state on the teeth 60.

In further examples, the roll angle $\epsilon_A$ is 12.4°-13.4°, the roll angle $\epsilon_B$ is 15.09°-16.09°, the roll angle $\epsilon_C$ is 23.16°-24.16°, and the $\epsilon_D$ is 25.85°-26.85°. In a further example, the roll angle $\epsilon_A$ is 12.9°, the roll angle $\epsilon_B$ is 15.59°, the roll angle $\epsilon_C$ is 23.66°, and the roll angle $\epsilon_D$ is 26.35°.

Figure 3:
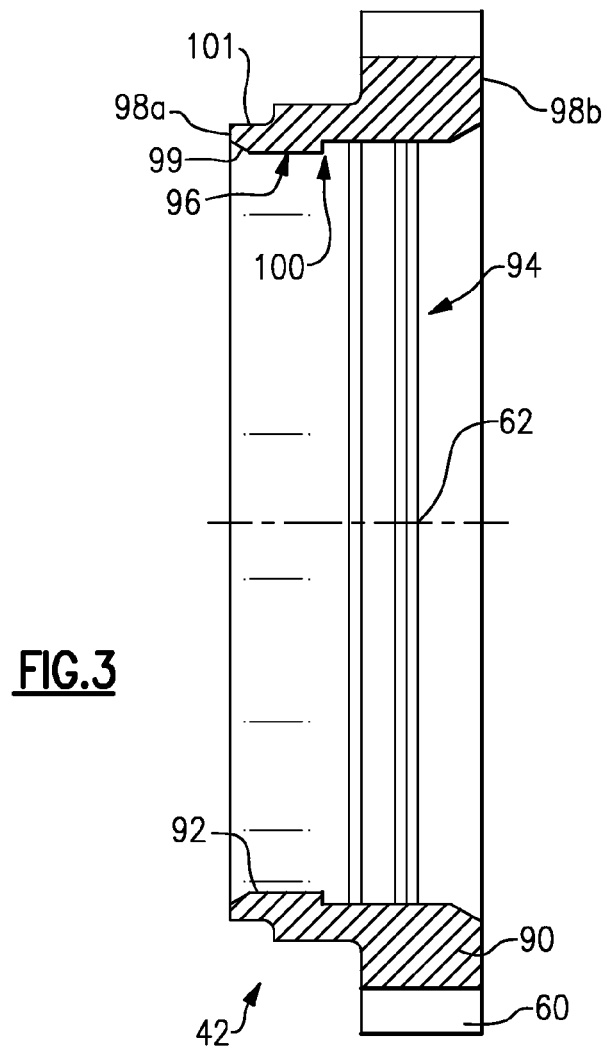
FIG. 3 illustrates a sectional view of the example rotor gear.

Referring to FIGS. 3, 4A, and 4B, the rotor gear 42 generally includes a gear body 90 that forms the teeth 60 along with a circumferential flange 92 that extends axially relative to the central axis 26. The rotor gear 42 includes a central opening 94 bound by a circumferential wall 96 that extends between terminal axial faces 98a and 98b. The axial face 98a terminates on a radially inner end at a sloped wall 99, which is non-parallel and non-perpendicular to the axial face 98a and the central axis 26. The radially outer surface of the flange 92 includes a lip 101, which reduces the amount of material in the flange 92 and thereby reduces the overall weight of the rotor gear 42.

The wall 96 includes a shoulder 100 for locating the rotor gear 42 on the rotor shaft 25. Likewise, the rotor shaft 25 may include a corresponding shoulder 102 (FIG. 1) that abuts the shoulder 100 to locate the rotor gear 42 at a desired axial position. In this example, the shoulder 100 is axially offset from the gear teeth 60 to provide the proper axial alignment between the teeth 60 of the rotor gear 42 and the teeth of the idler gear 48.

The shoulders 100 and 102 facilitate axial alignment between the rotor gear 42 and the idler gear 48. As an example, the axial face 98a of the rotor gear 42 abuts the rotor 28. The shoulder 100 is located a predetermined distance from the axial face 98a. In embodiments, the distance between the axial face 98a and the shoulder 100 may be 0.244±0.005 inches (6.07-6.32 millimeters). The distance from the shoulder 100 to the axial face 98b may be 0.426±0.005 inches (10.69-10.95 millimeters). The distances from the shoulder to the axial faces 98a and 98b determines the axial position of the rotor gear 42 for axial alignment with the idler gear 48. Thus, upon assembly of the generator 10, the rotor gear 42 will be at a fixed position and aligned with the idler gear 48 such that any variation in the position of the idler gear 48 causes minimal misalignment with the rotor gear 42.

The rotor gear 42 may be formed with the desired roll angles in a known gear manufacturing process. For instance, the process may include casting, forging, powder metallurgy, and/or machining from a blank. Thus, the process for forming the rotor gear 42 is not limited to any particular type as long as the selected process is capable of establishing the roll angles to be within the given example ranges.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotor gear for a generator, comprising:
a rotor gear body having a plurality of involute teeth circumferentially located about a center axis of rotation, each of the plurality of involute teeth including an involute surface that extends between a tooth tip and a tooth base, the involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, and the roll angle $\epsilon_A$ is 11.9°-13.9°, the roll angle $\epsilon_B$ is 14.59°-16.59°, the roll angle $\epsilon_C$ is 22.66°-24.66°, and the roll angle $\epsilon_D$ is 25.35°-27.35°.

2. The rotor gear as recited in claim 1, wherein the roll angle $\epsilon_A$ is 12.4°-13.4°, the roll angle $\epsilon_B$ is 15.09°-16.09°, the roll angle $\epsilon_C$ is 23.16°-24.16°, and the $\epsilon_D$ is 25.85°-26.85°.

3. The rotor gear as recited in claim 1, wherein the roll angle $\epsilon_A$ is 12.9°, the roll angle $\epsilon_B$ is 15.59°, the roll angle $\epsilon_C$ is 23.66°, and the roll angle $\epsilon_D$ is 26.35°.

4. The rotor gear as recited in claim 1, wherein the rotor gear body includes a wall that extends circumferentially around a central opening for receiving a rotor shaft, the wall including a shoulder for locating the rotor shaft.

5. The rotor gear as recited in claim 4, wherein the shoulder is axially offset from the plurality of involute teeth.

6. The rotor gear as recited in claim 4, wherein the rotor gear body includes a circumferential flange extending axially and terminating at an axial face for abutting a rotor.

7. The rotor gear as recited in claim 6, wherein the axial face is perpendicular to the center axis.

8. The rotor gear as recited in claim 7, including an axial distance between the axial face and the shoulder that is 0.239-0.249 inches (6.07-6.32 millimeters).

9. The rotor gear as recited in claim 7, wherein the rotor gear body extends between the axial face and an opposing axial face and includes an axial distance of 0.421-0.431 inches (10.69-10.95 millimeters) between the shoulder and the opposing axial face.

10. A rotor assembly for a generator, comprising:
a rotor shaft that is rotatable about a central axis; and
a rotor gear mounted on the rotor shaft, the rotor gear having a gear body that includes a plurality of involute teeth circumferentially located about a center axis of rotation, each of the plurality of involute teeth including an involute surface that extends between a tooth tip and a tooth base, the involute surface including at least reference points A-D thereon with reference point A being near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base and a reference base circle having a center origin at the center axis, and the roll angle $\epsilon_A$ is 11.9°-13.9°, the roll angle $\epsilon_B$ is 14.59°-16.59°, the roll angle $\epsilon_C$ is 22.66°-24.66°, and the roll angle $\epsilon_D$ is 25.35°-27.35°.

11. The rotor assembly as recited in claim 10, wherein the gear body includes a wall that extends circumferentially around a central opening for receiving a rotor shaft, the wall including a shoulder for locating the rotor shaft.

12. A generator comprising:
a stator;
a rotor shaft that is rotatable about a central axis;
a rotor mounted on the rotor shaft to be driven about the central axis within the stator and having a plurality of magnetic members circumferentially spaced around the rotor relative to the axis; and
a rotor gear mounted on the rotor shaft adjacent to the rotor, the rotor gear having a gear body that includes a plurality of involute teeth circumferentially located about a center axis of rotation, each of the plurality of involute teeth including an involute surface that extends between a tooth tip and a tooth base, the involute surface including at least reference points A-D thereon with reference point A being near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base and a reference base circle having a center origin at the center axis, and the roll angle $\epsilon_A$ is 11.9°-13.9°, the roll angle $\epsilon_B$ is 14.59°-16.59°, the roll angle $\epsilon_C$ is 22.66°-24.66°, and the roll angle $\epsilon_D$ is 25.35°-27.35°.

13. The generator as recited in claim 12, further comprising a hydraulic pump including a pump gear that is driven by the rotor gear.

14. The generator as recited in claim 13, further comprising an idler gear engaged with each of the rotor gear and the pump gear.

15. A method for processing a rotor gear for a generator, comprising:
forming a rotor gear body having a plurality of involute teeth circumferentially located about a center axis of rotation, each of the plurality of involute teeth including an involute surface that extends between a tooth tip and a tooth base, the involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, and establishing the roll angle $\epsilon_A$ to be 11.9°-13.9°, the roll angle $\epsilon_B$ to be 14.59°-16.59°, the roll angle $\epsilon_C$ to be 22.66°-24.66°, and the roll angle $\epsilon_D$ to be 25.35°-27.35°.

* * * * *